July 6, 1926.

A. C. WAGNER

MAP

Filed Dec. 13, 1923

1,591,865

Inventor
ARTHUR C. WAGNER.

By *Walter F. Murray*
Attorney

Patented July 6, 1926.

1,591,865

UNITED STATES PATENT OFFICE.

ARTHUR C. WAGNER, OF SOUTHGATE, KENTUCKY.

MAP.

Application filed December 13, 1923. Serial No. 680,488.

An object of my invention is to provide a composite map of a given area together with sectional portions thereof that will readily lend itself to use of motorists.

Another object of my invention is to provide a device for the purpose stated wherein the composite and sectional maps retain a constant relationship to one another whereby to facilitate following of determinable routes between the various points on a composite map through the sectional maps.

Another object is to provide a device of the class described wherein confusion and misdirection are eliminated as a result of turning from one sectional map to another for the purpose of following the continuation of a given road on various sectional maps.

Another object of my invention is to provide a map that will avoid the folding and soiling of various map portions as commonly occurs when employing a single large map of a given area that necessitates repeated folding and re-folding for keeping the portion of the map under consideration of such a size that a motorist may have his attention focused on a given road.

These and other objects are attained by the means described herein, and disclosed in the accompanying drawings, in which.

Figure 3:
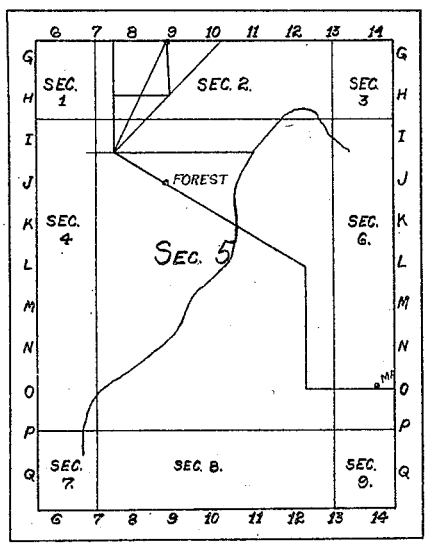
Fig. 3 is a view of a sheet showing a sectional map, and forming one of the pages of the book shown in Fig. 1.
Figure 2:
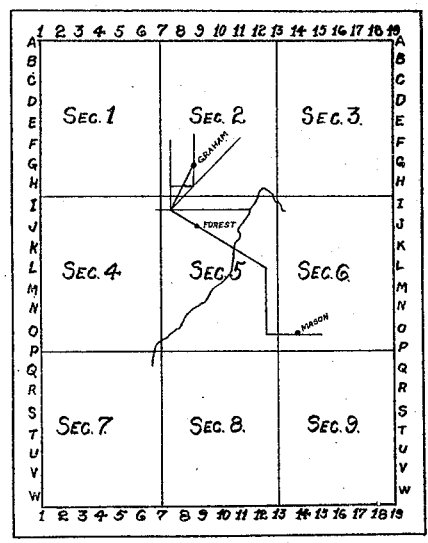
Fig. 2 is a view of a composite map embodying my invention and constituting one of the leaves of the book shown in Fig. 1.
Figure 1:
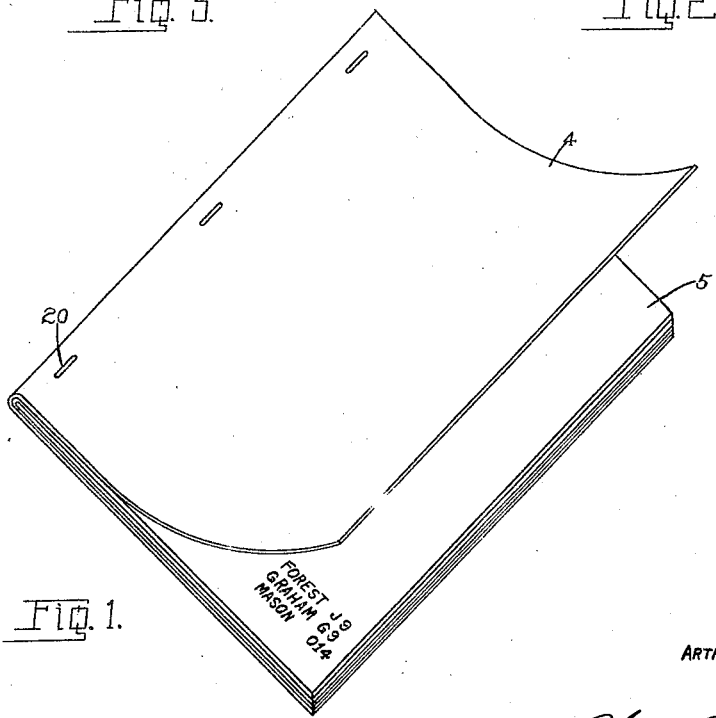
Fig. 1 is a perspective view of a book containing maps and data embodying my invention.

The composite map in Fig. 2 may be shown in any area such as a city, county, State or the like. The map disclosed in Fig. 2 is arbitrarily sub-divided into various sections. Along the opposite edges of the map are provided corresponding markings whereby to readily locate a given point on the map. As shown herein the upper and lower edges of the map are provided with consecutive numerals. The side edges are provided with consecutive letters of the alphabet. With each book 4 is provided an index sheet or sheets 5 on which may be listed in alphabetical order or in any other suitable manner the names of various localities, States, etc., determined by the nature of the area covered by the device. Each of the names of said communities or cities is associated with the combination of the letter and numeral that indicate imaginary intersecting perpendicular lines extending between like letters and like numerals on the map. When but one or two roads or paths communicate between certain localities through a given area, for example as shown in section 5 of the maps 2 and 3, it is possible to readily show a given road. However, when a plurality of roads and cross roads extend through a given area as shown in the upper left hand portion of section 5 and in the lower left hand portion of section 2, there is always great likelihood of misdirection and especially is this true when such intersection of roads occurs at the edge of a map and it is necessary to shift the map in order to continue any one of said roads onto another map or portion of a map. In order to avoid such misdirection or confusion each of the sections of the composite map is reproduced on an enlarged scale on a separate sheet as shown in Fig. 3, said sheets forming part of the book 4. If one who has been using a map section as shown in Fig. 3 for following a given road reaches the end of a given section he can note the relationship of a certain road as it extends into an adjacent section whereupon by turning to the enlarged re-production of said adjacent section he can readily locate the road upon which he is traveling, both by the employment of the combination letters and numerals and by the association with the line of the road that he has been following and part of which is re-produced adjacent the enlarged re-produced section that he is at that time observing.

It should be noted that the numerals and the letters at the edges of the map remain constant in relation to the various portions of the various map sections. In other words a town that is shown in the composite map, Fig. 2, at $J^9$ is shown in the enlarged sectional map, Fig. 3 at $J^9$.

The overlapping of various map sections is of great value in obviating misdirection of the user of my device.

The book may have its various leaves or sections secured upon one another in any suitable manner such as by stitching or by clips 20.

What I claim is:

A book type map comprising a composite map of a given area divided into arbitrary sections and enlarged separate maps of each section of the composite map, the enlarged separate maps each being bordered by similarly enlarged portions of adjoining sections as shown in the composite map.

In testimony whereof, I have hereunto subscribed my name this 6th day of December, 1923.

ARTHUR C. WAGNER.